United States Patent [19]
Tanaka et al.

[11] Patent Number: 5,684,641
[45] Date of Patent: Nov. 4, 1997

[54] OBJECTIVE LENS AND OPTICAL HEAD APPARATUS USING THE OBJECTIVE LENS

[75] Inventors: Yasuhiro Tanaka, Hyogo; Osamu Doi, Nara; Kenji Inoue, Hyogo; Jun Murata; Michihiro Yamagata, both of Osaka, all of Japan

[73] Assignee: Matsushita Electric Industrial Co., Ltd., Osaka, Japan

[21] Appl. No.: 570,639

[22] Filed: Dec. 11, 1995

[30] Foreign Application Priority Data

Dec. 21, 1994 [JP] Japan ..................... 6-317911

[51] Int. Cl.$^6$ ............... G02B 3/02; G02B 3/06; G11B 7/00
[52] U.S. Cl. ............... 359/719; 359/710; 359/711; 369/112
[58] Field of Search ............... 359/710, 711, 359/719; 369/112

[56] References Cited

U.S. PATENT DOCUMENTS

| | | | |
|---|---|---|---|
| 4,789,978 | 12/1988 | Shikama et al. | 369/112 |
| 4,886,959 | 12/1989 | Hoshi | 369/112 |
| 4,968,874 | 11/1990 | Kosuga | 359/710 |
| 5,535,058 | 7/1996 | Tanaka et al. | 359/719 |

OTHER PUBLICATIONS

"Principles of Optical Disc Systems", Published 1985 (Reprinted 1986) ©Adam Hilger Ltd. 1985, pp. 70–85.

*Primary Examiner*—Georgia Y. Epps
*Assistant Examiner*—Jordan M. Schwartz
*Attorney, Agent, or Firm*—Merchant, Gould, Smith, Edell, Welter & Schmidt, P.A.

[57] ABSTRACT

In an objective lens for an optical head apparatus for reading or writing an information on a recording medium such as optical disc, astigmatism is added on axial wavefront aberration so that off-axis astigmatism is to be cancelled by the axial astigmatism. At least one surface of the objective lens is a toric or cylindrical surface, and a standard deviation of astigmatism component of axial wavefront aberration is defined as Wa is to be restricted in a range of $0 < Wa < 0.07\lambda$ ($\lambda$ is a wavelength of a light to be used). When the objective lens moves in a radial direction of the optical disc, a light beam enters into the objective lens in an off-axis region where the aberration is compensated by the axial astigmatism.

14 Claims, 4 Drawing Sheets

OBJECTIVE LENS AND OPTICAL HEAD APPARATUS USING THE OBJECTIVE LENS

FIELD OF THE INVENTION

This invention relates to an objective lens which is to be used as an optical pick-up for a digital audio disc, a video disc, an optical memory for computer, and the like, and relates to an optical head apparatus using the objective lens.

DESCRIPTION OF THE PRIOR ART

In the optical pick-up for an optical disc, diffraction limited point images are focused on a surface of a recording medium, so that information is read out or written on the recording medium. A single lens having at least an aspherical surface has been widely used as an objective lens for focusing the point images. A light beam emitted from a semiconductor laser is reflected by a semitransparent mirror and focused on the surface of the recording medium of the optical disc by the objective lens. The light beam reflected by the recording medium passes through the objective lens and the semitransparent mirror, and collected on a photodetector by a detection lens. The objective lens is controlled by tracking error signals and always moved in a radial direction of the optical disc (reference document: PRINCIPLES OF OPTICAL DISC SYSTEMS, Adam Hilger, (1985) P. 70–85).

Generally, aberration of the objective lens on the optical axis is compensated for the best performance in the design stage, and the aberration increases when the image point departs from the optical axis in off-axis region. On the other hand, the objective lens of the optical pick-up for the optical disc always moves in the radial direction for tracking, so that the off-axis regions of the objective lens are used for focusing the point images in most cases. Thus, the objective lens is used in a bad condition with aberration which is poorly compensated.

SUMMARY OF THE INVENTION

The purpose of the invention is to provide an improved objective lens in which optical performance in the off-axis region is increased, and to provide an optical head apparatus using the objective lens.

An objective lens of this invention includes at least one toric surface or cylindrical surface, and satisfies the condition that $0<Wa<0.07\lambda$ when a standard deviation of the astigmatism component of axial wavefront aberration is defined as Wa and the wavelength of light used is defined as $\lambda$.

In the above-mentioned objective lens, it is preferable that at least one surface of the objective lens is aspherical. Furthermore, it is preferable that the objective lens is a single lens. Furthermore, it is preferable that the objective lens is a finite conjugated system. Furthermore, it is preferable that the objective lens is formed by glass molding or plastic molding. Furthermore, it is preferable that the objective lens is a bi-aspherical single lens, wherein one surface is rotationally symmetric and the other surface is rotationally asymmetric and given a shape defined by $C_5 R^2 \cos(2\theta)$ when $C_5$ is a coefficient of the asymmetric aspherical surface, and R and $\theta$ are coordinates on a rotationally asymmetric surface corresponding to polar coordinates $(R,\theta)$ on the rotationally symmetric surface around the optical axis.

Alternatively, an objective lens of this invention includes at least one toric surface or cylindrical surface, and satisfies the condition that $0.02\lambda<Wa<0.04\lambda$ when a standard deviation of the astigmatism component of axial wavefront aberration is defined as Wa and the wavelength of light used is defined as $\lambda$.

On the other hand, an optical head apparatus of this invention comprises a light source, an objective lens for focusing a light beam emitted from the light source on a recording medium, a beam splitter for splitting the light beam which is modulated by the recording medium, and a light receiving device for receiving the light beam modulated by the recording medium, and wherein the objective lens is one selected from the above-mentioned objective lenses.

In the above-mentioned optical head apparatus, it is preferable that a rotationally position of the objective lens around the optical axis is to be set in a manner to reduce the astigmatism when the objective lens is moved for tracking the recording medium.

As mentioned above, at least one surface of the objective lens of this invention is the toric surface or the cylindrical surface. The objective lens satisfies the condition of $0<Wa<0.07\lambda$ or preferably $0.02\lambda<Wa<0.04\lambda$ when a standard deviation of the astigmatism component of axial wavefront aberration is defined as Wa and the wavelength of light used is defined as $\lambda$. Therefore, the astigmatism can be added on the axial wavefront aberration without reducing the optical performance of the objective lens, so that the astigmatism in the off-axis region which occurs in the design stage can be cancelled. As a result, the objective lens having a good performance where the wavefront aberration is compensated in the off-axis region can be obtained. At least one surface of the objective lens is formed to be aspherical, so that the spherical aberration on the optical axis can be sufficiently compensated. Furthermore, the objective lens is a single lens, so that the weight of the objective lens can be reduced and the size can be down-sized. As a result, the size of the apparatus can be down sized and, when the objective lens is used in the optical head apparatus, the driving force for the head can be reduced. When the objective lens is a finite conjugated system, a collimator lens can be omitted, so that the objective lens is more effective for the optical head apparatus for optical disc. When the objective lens is formed of by molded glass process or made of plastic by compression or injection molding, the objective lens can be mass-produced inexpensively.

Furthermore, the optical head apparatus of this invention uses the objective lens in which the astigmatism is added on the axial wavefront aberration. Thus, the astigmatism, which occurs in the off-axis region in the design stage, can be cancelled by the above-mentioned astigmatism when the light beam enters obliquely into the objective lens by moving the objective lens for tracking the recording medium such as an optical disc. Therefore, an optical head apparatus, in which the variation of the optical performance due to the tracking is much reduced, can be provided. By setting the rotational position of the objective lens around the optical axis in a manner to reduce the astigmatism when the objective lens is moved for tracking the recording medium, a direction of the objective lens having the smallest aberration in the off-axis region can coincide with the moving direction of the objective lens. Thus, a part of the objective lens where the optical performance is the most stable can be used.

DETAILED DESCRIPTION OF THE INVENTION

Figure 1:
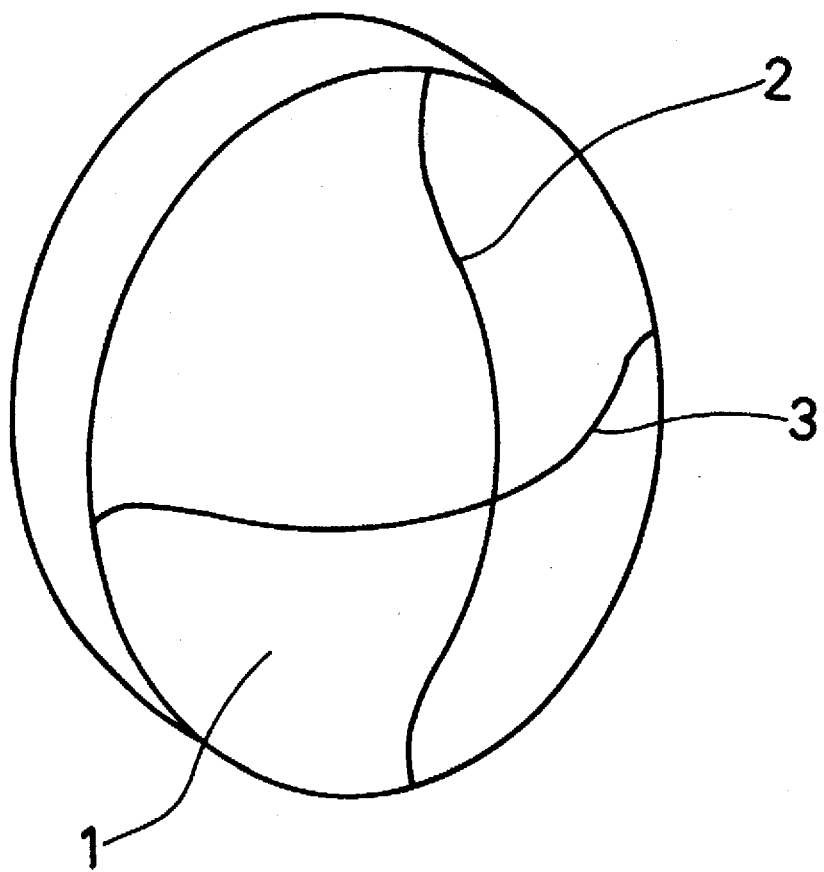
FIG. 1 is a perspective view showing an embodiment of an objective lens of this invention.

An embodiment of the objective lens of this invention is illustrated in FIG. 1. The objective lens 1 is a single lens. One surface of the objective lens 1 is rotationally symmetric aspherical. The other surface is rotationally asymmetric aspherical having a vertical ridge line 2 and a horizontal ridge line 3. The radius of curvature in the vertical direction is different from that in the horizontal direction. Accordingly, the ridge lines 2 and 3 respectively focus at different two points. The shapes of the aspherical surfaces are designed so that spherical aberration at respective focal points of the ridge lines 2 and 3 are compensated. Therefore, the spherical aberration of the objective lens 1 in directions of the ridge lines 2 and 3 are perfectly compensated. However, the objective lens 1 has astigmatism on the optical axis thereof.

Figure 4:
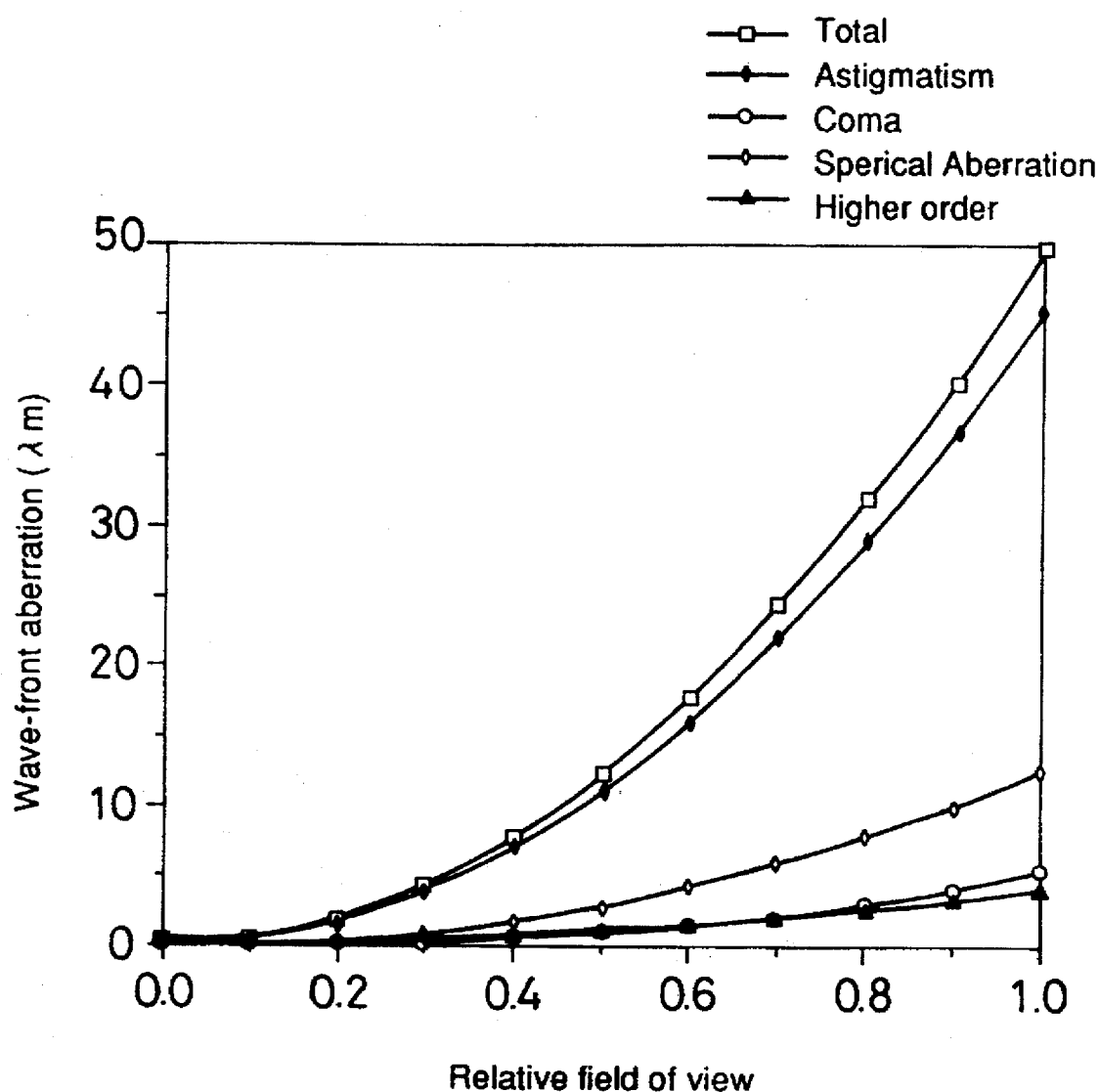
FIG. 4 is a characteristic chart showing characteristics of axial wavefront aberration of a general and conventional objective lens for the optical head apparatus.

The total wavefront aberration of a general and conventional objective lens from the optical axis to the off-axis region, and astigmatism, coma, spherical aberration and higher (more than sixth) order aberration which are analyzed by developing the wavefront aberration into Zernike series, are shown in FIG. 4. As can be seen from FIG. 4, the total wavefront aberration increases when the relative field of view increases from the optical axis to the off-axis region. However, most of the aberration is the astigmatism component. Accordingly, the astigmatism in the off-axis region can be cancelled by adding astigmatism on the optical axis. Therefore, the optical performance in the off-axis region of the objective lens can be increased. The method for increasing the off-axis performance of the objective lens is illustrated in FIG. 2.

Figure 2:
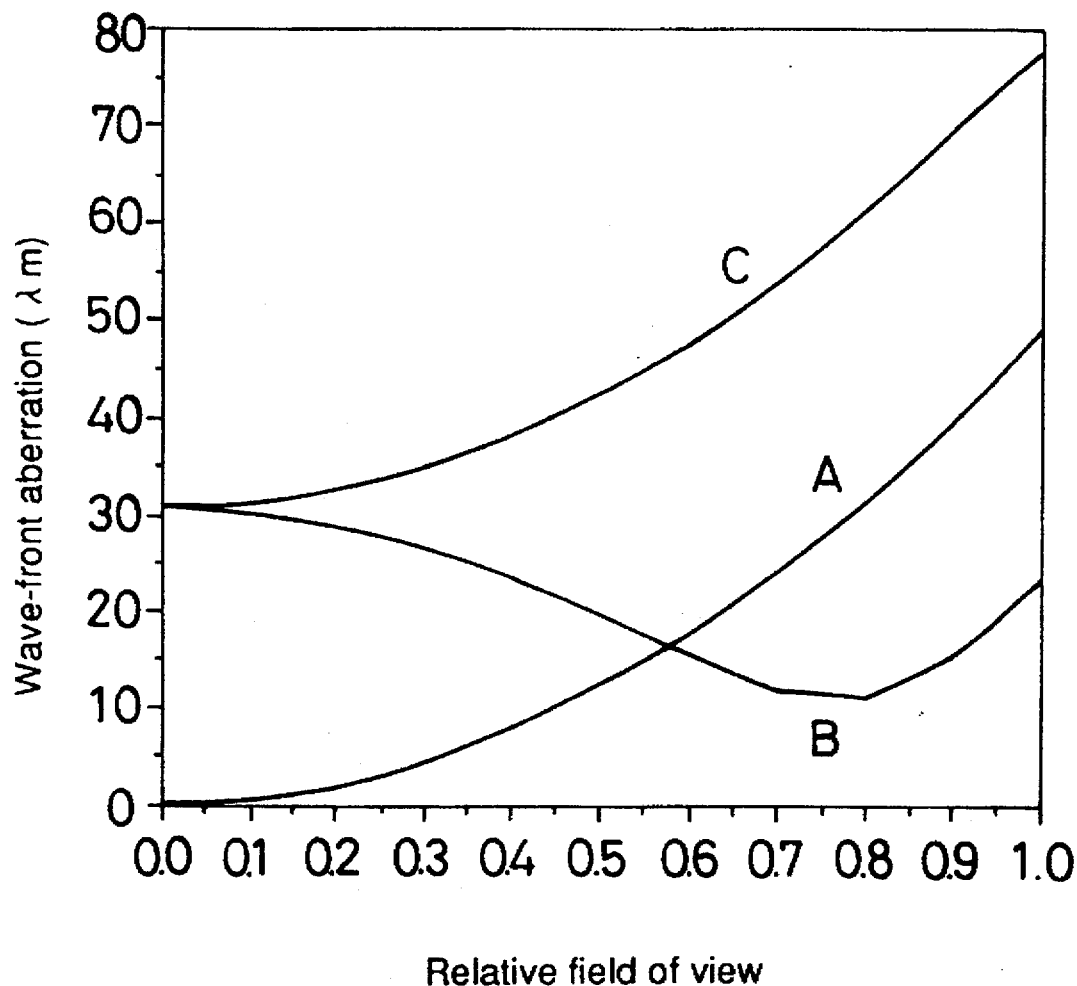
FIG. 2 is a characteristic chart showing characteristics of axial wavefront aberration of the objective lens of the above-mentioned embodiment.

In FIG. 2, a characteristic curve A shows the off-axis performance of a conventional objective lens. Characteristic curves B and C show the off-axis performance when astigmatism of about 30 mλ (mλ: 1/1000 of the wavelength of light to be used) on the optical axis is added to the same objective lens. As can be seen from FIG. 2, the addition of astigmatism of 30 mλ has an effect on the off-axis performance. The characteristic curve B shows the off-axis performance calculated for a direction along which the off-axis astigmatism is cancelled by the added astigmatism. The wavefront aberration for the off-axis region having a relative field of view larger than about 0.57 is less than the wavefront aberration shown by the characteristic curve A. On the other hand, the characteristic curve C shows the off-axis performance in a direction perpendicular to the direction of the characteristic curve B for increasing the astigmatism on the optical axis, in which the astigmatism of 30 mλ is directly added to the aberration shown by the characteristic curve A.

The objective lens of the optical head apparatus for optical disc is controlled for following the tracks of the optical disc by a tracking servo control system. In the servo tracking operation, the moving direction of the objective lens is only the radial direction of the optical disc. Namely, the objective lens can move in only one dimension. Accordingly, when the objective lens having the off-axis performance shown by the characteristic curve B is used in a manner so that the direction of good off-axis performance coincides with the radial direction of the optical disc, the aberration of the objective lens in the off-axis region can be reduced. In FIG. 2, attending to the aberration at the relative field of view of 1.0, the aberration of the conventional objective lens shown by the characteristic curve A is about 50 mλ. On the other hand, the aberration of the objective lens of this invention shown by the characteristic curve B is about 25 mλ. Therefore, the aberration can be cut in half.

The objective lens of the optical head apparatus is demanded to have the optical performance at the diffraction limit. As a criterion for satisfying the optical performance at the diffraction limit, the Maréchal criterion is well known. By the Maréchal criterion, the wavefront aberration must be smaller than 0.07λ. Therefore, when the standard deviation of astigmatism component in the wavefront aberration on the optical axis is defined as Wa, it is preferable that the objective lens satisfies the condition of 0<Wa<0.07λ or more preferably 0.02λ<Wa<0.04λ, since no aberration but the aberration Wa occurs on the optical axis. If the astigmatism is larger than the upper limit, the astigmatism on the optical axis becomes too large to satisfy the optical performance on the optical axis which is necessary for the objective lens of the optical head apparatus for optical disc. Furthermore, the aberration in the region that the objective lens is the most widely used becomes much larger, so that the entire performance of the optical lens will be reduced. On the other hand, if the astigmatism is smaller than the lower limit, the astigmatism on the optical axis becomes too small to compensate the astigmatism in the off-axis region.

A numerical embodiment of the objective lens of this invention is shown below. In the numerical embodiment, f: focal length of the objective lens;
NA: numerical aperture of the objective lens;
R1: radius of curvature of the first surface of the objective lens;
R2: radius of curvature of the second surface of the objective lens;
d: thickness of the objective lens;
n: refractive index of a material of the objective lens;
dc: thickness of the optical disc;
nc: refractive index of the optical disc material;
WD: working distance of the objective lens;
s: distance from the first surface of the objective lens to a light source;
m: magnification of the image;
λ: wavelength of light used in the design stage; and
oh: objective height.

The shape of each aspherical surface is defined by the equation:

$$X_i = \frac{c_i h^2}{1 + (1 - (cc_i + 1)c_i^2 h^2)^{1/2}} + \sum_n A_{in} h^n$$

for i=1,2

$X_i$: distance from a tangential plane at a vertex of the i-th aspherical surface at a point having a height h from the optical axis;

h: height from the optical axis;

$C_i$: curvature at the vertex of the aspherical surface of the first surface of the objective lens ($C_i=1/R_i$);

$CC_i$: conical constant of the i-th surface of the objective lens; and $A_{in}$: n-th order aspherical coefficient of the i-th surface of the objective lens.

(Numerical Value)

f=3.3141
NA=0.45
R1=2.3500
R2=−3.8689
d=2.75
n=1.51974
dc=1.2
nc=1.571
WD=1.813
s=23.2043
m=−0.1778
λ=780 (nm)
oh=0.700
$CC1=-3.00555 \times 10^{-1}$
$CC2=-6.59668$
$A14=-5.00518 \times 10^{-3}$
$A16=-4.59093 \times 10^{-4}$
$A18=-3.87734 \times 10^{-5}$
$A110=-1.17422 \times 10^{-5}$
$A24=5.27110 \times 10^{-3}$
$A26=-1.61964 \times 10^{-3}$
$A28=1.33220 \times 10^{-4}$
$A210=2.08278 \times 10^{-6}$ Furthermore, a shape designated by $C_5R^2 \cos(2\theta)$ was added on the first surface which was a rotationally asymmetric aspherical surface, when the polar coordinates of the first surface around the optical axis was (R,θ). The rotationally asymmetric aspherical factor $C_5=1.4678282 \times 10^{-4}$.

In the above-mentioned numerical embodiment, the wavefront aberration of the objective lens were the same as shown by characteristic curves B and C in FIG. 2. Thus, even when the objective lens moves for tracking the optical disc, the change of the wavefront aberration is very small. For example, the height of the object was 0.7 mm in this numerical embodiment. The relative field of view 0.8 corresponds to a height 0.56 mm of the object. As can be seen from FIG. 2, in a region having the height larger than 0.56 mm, the wavefront aberration of the objective lens of this invention is smaller than that of the conventional objective lens shown by the characteristic curve A.

For forming such a toric surface, the objective lens can be formed by molded process either glass or plastic, or injection molding of plastic. By providing the toric surface shape on a die, the objective lens having substantially the same axial astigmatism can be manufactured.

Figure 3:
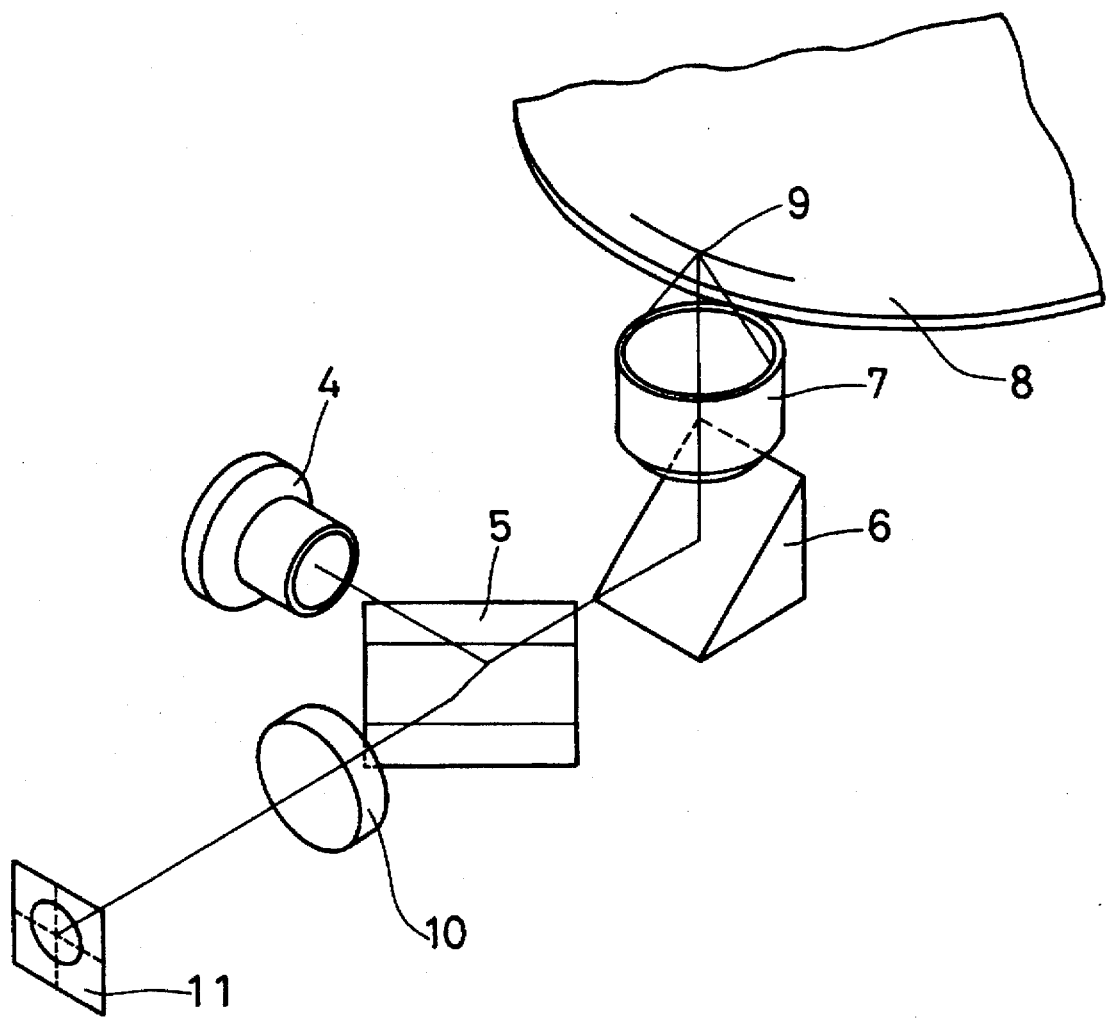
FIG. 3 is a perspective view showing a configuration of an optical head apparatus of this invention.

Next, an optical head apparatus of this invention using the above-mentioned objective lens is illustrated in FIG. 3. As shown in FIG. 3, a light beam emitted from a semiconductor laser 4 is reflected by a semitransparent mirror 5. The light beam reflected by the semitransparent mirror 5 is further reflected by a mirror 6. The light beam is focused on a recording medium surface 9 of an optical disc 8 by an objective lens 7. The focused beam spot is diffracted by concave and convex patterns formed on the recording medium surface 9. The light beam reflected and diffracted by the recording medium surface 9 passes through the semitransparent mirror 5 and is focused on a photodetector 11 by a detection lens 10. A change in the amount of the light modulated by the recording medium surface 9 is detected by electrical signals from the photodetector 11. Thus, data recorded on the optical disc 8 can be read out. Here, the objective lens 7 is a finite conjugated system, and the objective lens 7 moves in a radial direction of the optical disc 8 for tracking the recording medium surface 9. Thus, the light beam enters into the objective lens 7 obliquely. Accordingly, it is preferable that the objective lens 7 has an optical performance which is essentially constant with respect to the movement of the objective lens 7. The objective lens 7, having the axial astigmatism, is disposed in a manner that the direction of the objective lens 7 for cancelling the axial astigmatism coincides with the radial direction of the optical disc 8. As a result, good optical performance of the objective lens 7 in the off-axis region can be obtained.

In the above-mentioned embodiments, a single lens is used as the objective lens. However, a combination lens constituted by a plurality of single lenses can be used as an objective lens. In the latter case, it is possible that the rotationally asymmetric shape can provided on only one surface of the lenses. Alternatively, the rotationally asymmetric surface can be provided on a plurality of surfaces of the lenses. Furthermore, a cylindrical lens having low refractive power can be combined with the rotationally asymmetric surface.

Furthermore, in the above-mentioned embodiment, the objective lens is a finite conjugated system. However, even when the objective lens is an infinite conjugated system, an astigmatic difference of the semiconductor laser, an astigmatism generated by a collimator lens and an astigmatism generated by a compensating optical system for an elliptical light beam can be compensated. Furthermore, when one surface of the objective lens is flat, the other surface of the objective lens can be formed as not only a toric surface but also a cylindrical surface. Furthermore, the optical head apparatus of this invention can be used for not only reading the data but also writing the data on the optical disc.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A bi-aspherical single objective lens comprising: a first surface rotationally symmetric about an optical axis; and a second surface rotationally asymmetric about the optical axis and having a shape defined by $$C_5R^2 \cos(2\theta)$$

in which $C_5$ is a coefficient of the asymmetric aspherical surface, and R and θ are coordinates on said rotationally asymmetric surface corresponding to polar coordinates (R,θ) on a symmetric surface; and wherein said second surface is a toric surface or a cylindrical surface, and satisfies the condition that $$0 < Wa < 0.07\lambda$$

in which a standard deviation of an astigmatism component of axial wavefront aberration is defined as Wa and a wavelength of light used is defined as λ.

2. The objective lens in accordance with claim 1, wherein said objective lens is a finite conjugated system.

3. The objective lens in accordance with claim 1, wherein said objective lens is formed by glass molding or plastic molding.

4. A bi-aspherical single objective lens comprising: a first surface rotationally symmetric about an optical axis; and a second surface rotationally asymmetric about the optical axis and having a shape defined by $$C_5R^2 \cos(2\theta)$$

in which $C_5$ is a coefficient of the asymmetric aspherical surface, and R and θ are coordinates on said rotationally asymmetric surface corresponding to polar coordinates (R,θ) on a rotationally symmetric surface; and wherein said second surface is a toric surface or a cylindrical surface, and satisfies the condition that $$0.02 < Wa < 0.04\lambda$$

in which a standard deviation of an astigmatism component of axial wavefront aberration is defined as Wa and a wavelength of light used is defined as λ.

5. The objective lens in accordance with claim 4, wherein said objective lens is a finite conjugated system.

6. The objective lens in accordance with claim 4, wherein said objective lens is formed by glass molding or plastic molding.

7. An optical head apparatus comprising a light source, an objective lens for focusing a light beam emitted from the light source on a recording medium, a beam splitter for splitting the light beam which is modulated by the recording medium, and a light receiving device for receiving the light beam modulated by the recording medium, and wherein said objective lens is a bi-aspherical single lens, comprising a first surface that is rotationally symmetric about an optical axis and a second surface that is rotationally asymmetric about the optical axis and has a shape defined by $$C_5 R^2 \cos(2\theta)$$

in which $C_5$ is a coefficient of the asymmetric aspherical surface, and R and θ are coordinates on said rotationally asymmetric surface corresponding to polar coordinates (R,θ) on a rotationally symmetric surface; and said second surface is a toric surface or a cylindrical surface, and satisfies the condition that $$0 < Wa < 0.07\lambda$$

in which a standard deviation of an astigmatism component of axial wavefront aberration is defined as Wa and a wavelength of light used is defined as λ.

8. The optical head apparatus in accordance with claim 7, wherein said objective lens is a finite conjugated system.

9. The optical head apparatus in accordance with claim 7, wherein said objective lens is formed by glass molding or plastic molding.

10. The optical head apparatus in accordance with claim 7, wherein a rotational position of said objective lens around the optical axis is to be set in a manner to reduce the astigmatism when said objective lens is moved for tracking said recording medium.

11. An optical head apparatus comprising a light source, an objective lens for focusing a light beam emitted from the light source on a recording medium, a beam splitter for splitting the light beam which is modulated by the recording medium, and a light receiving device for receiving the light beam modulated by the recording medium, and wherein said objective lens is a bi-aspherical single lens, comprising a first surface that is rotationally symmetric about an optical axis and a second surface that is rotationally asymmetric about the optical axis and has a shape defined by $$C_5 R^2 \cos(2\theta)$$

in which $C_5$ is a coefficient of the asymmetric aspherical surface, and R and θ are coordinates on said rotationally asymmetric surface corresponding to polar coordinates (R,θ) on a rotationally symmetric surface; and said second surface is a toric surface or a cylindrical surface, and satisfies the condition that $$0.02\lambda < Wa < 0.04\lambda$$

in which a standard deviation of an astigmatism component of axial wavefront aberration is defined as Wa and a wavelength of light used is defined as λ.

12. The optical head apparatus in accordance with claim 11, wherein said objective lens is a finite conjugated system.

13. The optical head apparatus in accordance with claim 11, wherein said objective lens is formed by glass molding or plastic molding.

14. The optical head apparatus in accordance with claim 11, wherein a rotational position of said objective lens around the optical axis is to be set in a manner to reduce the astigmatism when said objective lens is moved for tracking said recording medium.

* * * * *